(12) United States Patent
Costa et al.

(10) Patent No.: US 7,852,195 B2
(45) Date of Patent: Dec. 14, 2010

(54) AUTHENTICATION OF SOURCE, PLUS, FOR GOODS AND SERVICES SYSTEM, METHOD, AND COMPONENTS

(75) Inventors: Pasquale Vincent Costa, Concord, MA (US); Ernest G. Henrichon, Jr., Bedford, NH (US); Curtis W. Howes, Harvard, MA (US)

(73) Assignee: Valmarc Corporation, Needham, MA (US)

( * ) Notice: Subject to any disclaimer, the term of this patent is extended or adjusted under 35 U.S.C. 154(b) by 608 days.

(21) Appl. No.: 11/728,794

(22) Filed: Mar. 27, 2007

(65) Prior Publication Data

US 2008/0238611 A1    Oct. 2, 2008

(51) Int. Cl.
*G06T 1/00* (2006.01)
(52) U.S. Cl. .......................................... 340/5.8; 705/59
(58) Field of Classification Search ............... 340/572.1, 340/5.8; 705/51, 59
See application file for complete search history.

(56) References Cited

U.S. PATENT DOCUMENTS

| | | | | |
|---|---|---|---|---|
| 4,939,356 A | * | 7/1990 | Rando et al. | 235/462.2 |
| 5,585,616 A | * | 12/1996 | Roxby et al. | 235/462.06 |
| 2005/0273434 A1 | * | 12/2005 | Lubow | 705/59 |

* cited by examiner

*Primary Examiner*—Jeffery Hofsass
(74) *Attorney, Agent, or Firm*—Morris I. Pollack

(57) ABSTRACT

A unique identifier is created for each article (clothing, accessories, jewels, fragrances, manufactures, etc.) for which the provider of the article desires to authenticate its Brand source to the party acquiring the article to substantiate to that acquiring party that they are receiving a genuine article. The unique identifier is so provided from a secure third party that also stores the unique identifier, possibly with other historical information, in a secure data base accessable only by authorized parties. The unique identifier may be provided on tags to be carried by the respective article or it may be applied directly to the article as by direct part marking from the material of the article and when so provided it includes a brand source identifier of the party providing the unique identifier as an additional protective measure. The unique identifier furthermore may be provided as an encoded, imageable symbology such as a "Data Matrix".

15 Claims, 8 Drawing Sheets

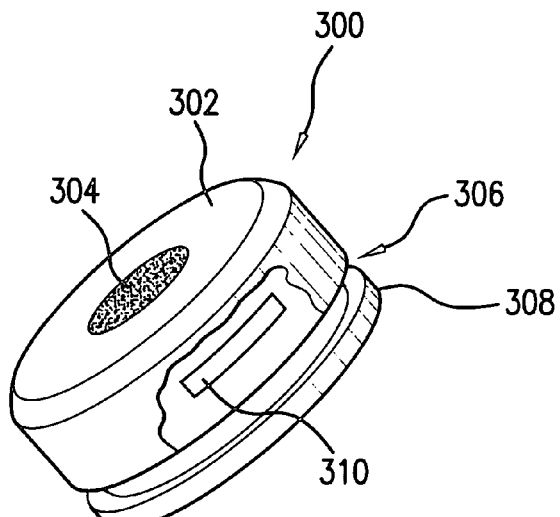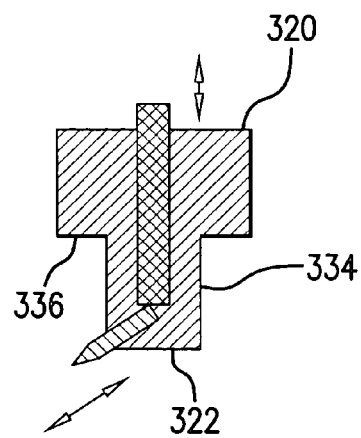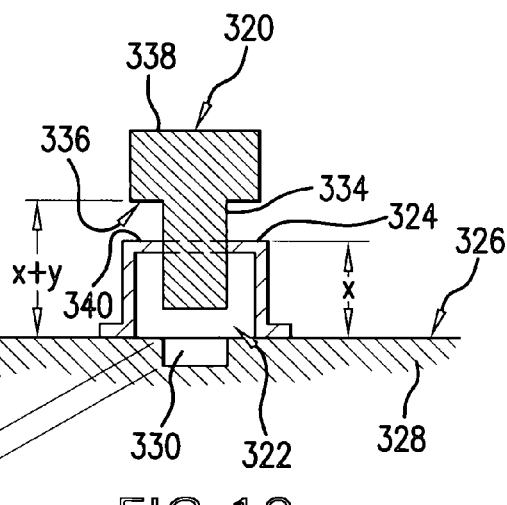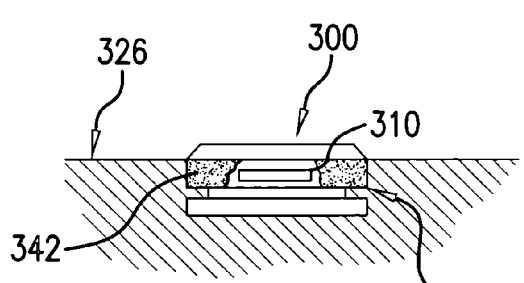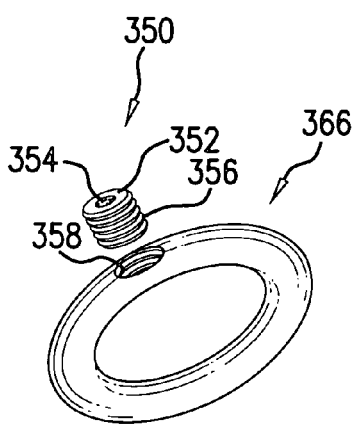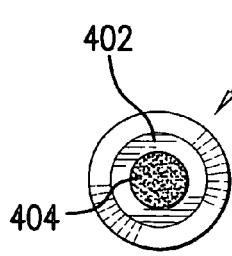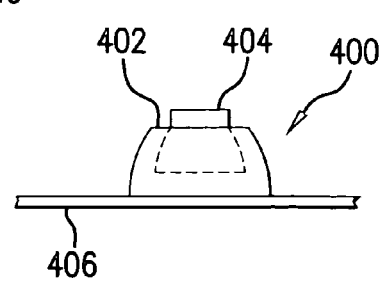

AUTHENTICATION OF SOURCE, PLUS, FOR GOODS AND SERVICES SYSTEM, METHOD, AND COMPONENTS

BACKGROUND OF THE INVENTION

1. Field of Application

This invention relates primarily to authentication of the "source" of Branded goods and services, as well as other aspects of such Branded goods and services; and, more particularly, to providing such Branded goods and services with a readily observable and authenticateable identifier of at least Brand "source" authenticity.

2. Description of the Prior Art

Many parties (corporations, partnerships, individuals, associations, etc.) spend considerable amounts, possibly millions, in advertising and other marketing efforts to create Brand names and generate good will. In some cases, further amounts (here again possibly millions) are often spent in developing products to be marketed under these Brand names. Successful Brand names represent a valuable asset of a party, and are often the focus of great efforts undertaken to police the proper and authorized use of such Brand names. Despite these efforts, successful Brand names have been wrongfully exploited for years by unscrupulous parties such as manufacturers and resellers of counterfeit and/or stolen and diverted products. High price luxury type goods in particular have been, and continue to be, subjected to widespread counterfeiting, theft and diversion.

A Brand (or trademark, or service mark, as they are often referred to), as referred to herein, is any word, name, phrase, symbol, design or device or any combination of words, names, phrases, symbols, designs or devices which identifies and distinguishes the "source" (such as the manufacturer, retailer, provider, etc.) of the goods or services of one party from those of another party. Brands are used by a party, in connection with a product or products, or service or services, to help consumers (purchasers) identify that product, or service, and distinguish that product, or service, from the products, or services, of competitors. Brands indicate to consumers that a product, or service, comes from a "source", even if the name of the "source" is unknown to the consumer. Brands also function to indicate quality and reputation, thus creating good will in the proprietor (owner, "source") of the Brand.

The use of Brands (trademarks and service marks) benefits the consuming public as well as the merchant or manufacturer of a product, or service. For the merchant or manufacturer, a Brand serves as an advertising tool, facilitating repeat sales and the successful marketing of new products and services. Individual consumers rely on Brands to distinguish among competing products and services and to represent a certain level of quality they have come to expect when purchasing products or services with which a particular Brand is used. By protecting Brands, several broader goals are furthered as well. Brands foster competition and the maintenance of quality by securing to the producer (the "source") the benefits of good reputation. Protecting Brands also serves to guard the public from inadvertent or intentional use of confusing or misleading Brands.

The actual lost sales and profits attributed to wrongful activities (counterfeiting, theft, diversion, knock-offs, etc.) is but one aspect of the problem. An often more serious result is the damage done to the good name and reputation of the Brand owner ("source") especially when inferior counterfeited merchandise is sold as genuine. In an effort to counteract the problem, Brand name owners often aggressively pursue counterfeiters, and introduce programs intended to eliminate or at least reduce such illegal activities. While some programs have met rather limited short term success, the end rewards to the wrongdoers are often so large that the programs themselves have been copied.

According to one such program, Brand-authenticating holographs are incorporated into either the product packaging or a swing tag, or placed on the packaging or product in the form of a self-adhesive decal. While once considered a novel and innovative approach, holograph technology is now well known, and the cost of entry into the holograph manufacturing industry is low. In today's market, counterfeit holographs are commonplace. Thus the use of holograms has not proved effective to stem the problem, especially for the consumer at the time and point of sale.

In another anti-counterfeiting program, a hidden authenticating device (such as one that incorporates RFID technology, or special threads or a chemical) is incorporated into the product. This approach is problematic, as it is generally difficult to control and lacks standardization with regard to where to place the device. While the hidden device is detectable by field inspectors checking a reseller's inventory, consumers are generally unaware of the device, and whether or not the Brand "source" of the merchandise is genuine and authenticated as such. A still further approach uses moving image labels (including 3D) typically manufactured with a paper printing image including PVC reflectors. This method, however, is often unsuitable for the intended goods or services. Furthermore, the technology is well known, thus leading to the same problems realized from holographs.

Many programs utilize a multi-layer approach to product security with both overt and covert types of identifiers incorporated into the product and/or its packaging. However not only does this add unacceptably to the product cost but it does not seem to provide a consumer with Brand "source" authentication, especially at the time and point of sale.

The use of serial numbers to track, and hopefully control, product security has proved helpful for vehicles as VIN (Vehicle Identification) Numbers, and also for product warranty purposes. But, serial numbering alone does not seem to be an effective Brand "source" authenticator for the consumer as they do not currently have ready access to the identifying data base, or any indicator that authentication is available to them, at the time and point of sale. Systems, such as those shown in U.S. Pat. No. 5,521,815 for "Uniform System For Verifying and tracking Articles of Value" and in U.S. Pat. No. 6,076,064 for "Uniform System For Verifying And Tracking The Title of Articles or Objects of Value" are further examples of complex and expensive product security systems that require access to data bases, through computer terminals, to verify product security and would prove cumbersome to a consumer at the time and place of sale and, as such unacceptable.

U.S. Pat. No. 6,099,930 for "Methods and Marking Digital Compact Discs As A Means To Determine it's Authenticity" utilizes near infrared fluorophores; but, requires a protective cover layer which would not only be unacceptably detrimental to the aesthetics of the product but might, as well, be unusable for items of jewelry and the like. U.S. Pat. No. 6,533,180 for "Security Label and Method of Use" also only provides an obtrusive and unacceptable label that must be attached to the product; while U.S. Pat. No. 6,578,112 requires special buttons with a complex and relatively expensive sewing machine to attach the buttons with a relatively complex stitch.

SUMMARY OF THE INVENTION

Therefore, it is an object of the invention to provide a new and novel authenticity identifier, system, method and components for authenticating the "source" of Branded articles.

It is another object of the invention to provide a new and novel Brand authenticity system which utilizes a specially designed authenticator to be carried by an article so as to be easily and obviously located thereon.

It is another object of the invention to provide a new and novel Brand authenticity system which utilizes a specially designed authenticator to be carried by an article so as to be easily and obviously located thereon, at least by a consumer at the time and point of sale.

It is another object of the invention to provide a new and novel Brand "source" authentication system wherein the authenticator is encoded and provided under authority of the Brand "source" to indicate the Brand and by doing so authenticating the legitimate "source" of an article.

It is another object of the invention to provide a new and novel Brand "source" authentication system wherein the authenticator carries an obviously observable Brand "source" of the authenticator and authentication system.

It is another object of the invention to provide a new and novel Brand "source" authentication system wherein the authenticator may also include a trademark of the Brand owner.

It is another object of the invention to provide a new and novel Brand "source" authentication system wherein symbology encoded authenticators are supplied in sets to Brand owners, who would then control their further use It is another object of the invention to provide a new and novel Brand "source" authentication system wherein symbology encoded authenticators, each including unique identifying codes to provide individual item identification and authenticity, are supplied to Brand owners, who would then control their further use It is another object of the invention to provide a new and novel Brand "source" authentication system wherein symbology encoded authenticators are supplied in sets, with each authenticator in the set serially numbered, to Brand owners, who would then control their further use It is another object of the invention to provide a new and novel Brand "source" authentication system which readily identifies Brand "source" genuine articles and may further identify other characteristics pertinent to the article.

It is another object of the invention to provide a new and novel Brand "source" authentification system which promotes support through an advertising campaign, putting customers, vendors and manufacturers on alert against counterfeiting and other wrongdoings and the penalties that may result.

It is another object of the invention to provide a new and novel Brand "source" authentification system which promotes support by subjecting pirates to multiple legal causes of action.

It is another object of the invention to provide a new and novel Brand "source" authentification system which has a centralized control and supply of authenticators.

It is yet another object of this invention to provide a new and novel symbology reader/imager/decoder particularly for a Brand "source" authentication system.

It is yet still a further object of this invention to provide a new and novel combination of encoded symbology and reader/imager wherein the encoded symbology and the symbology carrier are of such a high quality as to effectively minimize the cost of the reader/imager while still providing accuracy of decoding of the symbology.

It is yet still an even further object of this invention to provide a new and novel authenticator wherein both direct part marked encoded symbology and an RFID encoded chip are combined for Brand "source" authentication and for other ID purposes if desired.

These and other objects of the present invention are achieved in the preferred embodiments disclosed below by providing Brand "source" authenticators for authenticating at least the "source" of a manufactured article.

According to a preferred embodiment of the invention, the Brand "source" authenticator is displayed at any suitable location upon and/or within the article, preferably on an outside surface; but always as a status symbol that the article is Brand "source" authenticated.

According to the preferred embodiment of the invention, the Brand "source" authenticator is a relatively thin, circular disk having at least its own Brand applied thereto as well as encoded symbology.

The present invention provides a solution for reducing counterfeiting. While the system of the invention could theoretically be copied, the cost of doing so—and the risk of being caught—would be too high to justify the rewards. By incorporating consumer education into the system and advertising the method of detecting counterfeit products, the market for counterfeit goods sold as genuine would be greatly curtailed.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 17 is a schematic of an alternative embodiment of authenticator incorporating the instant invention and cut away in part to better show both direct part marked 2D encoded symbology as well as an RFID chip which also includes encoded symbology;

FIG. 18 is a sketch of a cutting tool for use with the authenticator of FIG. 17 to facilitate attaching same to an article to have its Brand "source" authenticated;

FIG. 19 is a sketch of the cutting tool of FIG. 18 utilized with a depth gauge to form a seat in an article, to have its Brand "source" authenticated, to receive the authenticator of FIG. 17;

FIG. 20 is a sketch of the authenticator of FIG. 17 seated and attached to an article that is to have its Brand "source" authenticated and which is cut away in part to better show the imbedded RFID chip;

FIG. 21 is a schematic perspective showing of an alternative embodiment of authenticator. Incorporating the instant invention, that has the encoded symbology direct part marked on its surface and fabricated for insertion into a metal casing, such as a watch case so that the symbology may be read and decoded;

FIG. 22 is a plan view of an article of jewelry with the authenticator Brant and encoded symbology direct part marked into the material of the jewelry; and FIG. 23 is a side view of the article of jewelry of FIG. 22 with the authenticator Brant and encoded symbology direct part marked into the material of the jewelry.

DESCRIPTION OF THE INVENTIVE EMBODIMENTS

Figure 1:
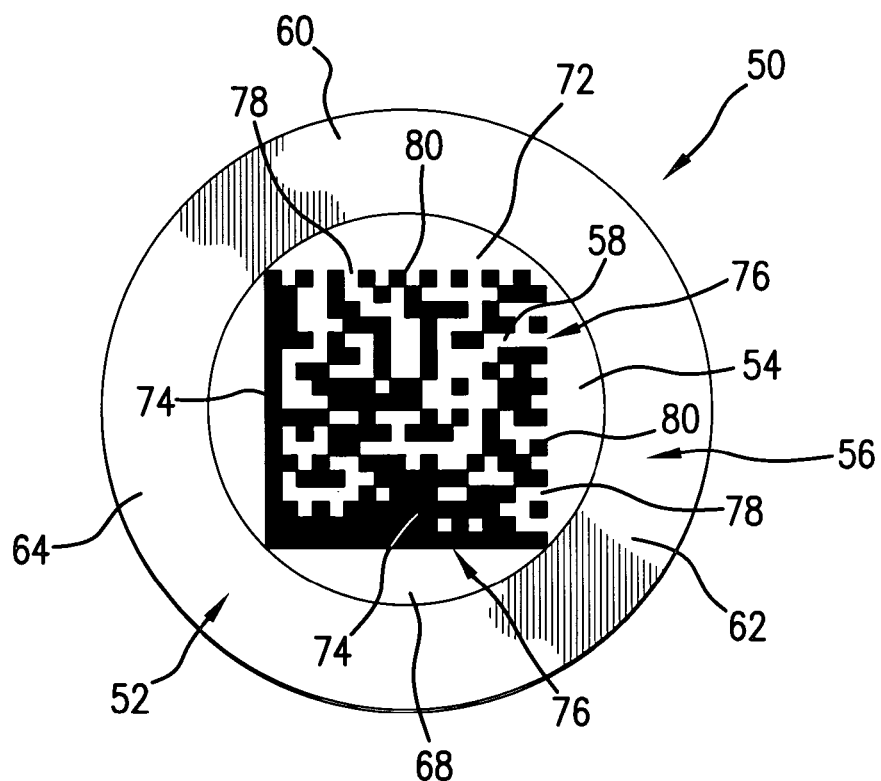
FIG. 1 is a plan view of a new and novel Brand "source" authenticator, incorporating the instant invention, enlarged to better show details thereof.
Figure 2:
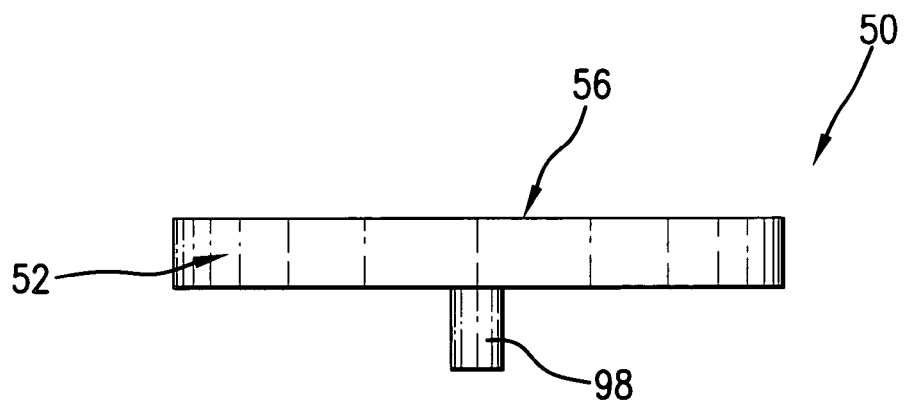
FIG. 2 is a side view of the Brand "source" authenticator of FIG. 1.

With reference to FIGS. 1 & 2 there is generally shown an authenticator 50 incorporating the instant invention and which is fabricated from an authenticator blank 52 of predetermined configuration, size and thickness. While authenticator 50 is shown as fabricated from a circular blank 52 it may just as well be fabricated from a blank of any convenient configuration such as square, triangular, oval, hexagon, octagonal, or the like, depending on the information to be carried by the authenticator and the aesthetics and other criteria of the authentication system and authentication system provider. Authenticator blank 52 is preferably fabricated from good quality steel or other metal, or combinations or compounds of metal, and so as to provide a data field 54 on a surface 56 that will accept encoded symbology 58 applied therein as by direct part markings such as by dot peening. Ceramics, glass, plastics and other materials, natural and/or synthetic, suitable to accept direct part markings of encoded symbology 58, may just as well be utilized for authenticator blanks 52. While authenticator 50 is shown and described with direct part markings it may just as well have its encoded symbology 58 applied onto a substrate and the substrate affixed to surface 54 of authenticator 50.

One or more Brand fields 60, 62, 64 are also provided on surface 56 of authenticator blank 52 in addition to data field 54. At least one of said Brand fields 60, 62, 64 is to carry and display the Brand of the authentication system provider or Brand "source" of the authenticator itself. While all or some of the Brand fields 60, 62, 64 may also carry and display the Brand of the authentication system provider one or more of said Brand fields 60, 62, 64 may be allocated to carry and display the Brand to be authenticated or other Brand of the Brand "source" to be authenticated. Such Brands of the authentication system provider and the Brand "source" to be authenticated which are carried and displayed in fields 60, 62 and 64 are so carried and displayed unencoded and user recognized; while authentication data 68, carried by and displayed in authentication field 54, is allocated preferably to encoded symbology 58.

Encoded symbology 58 is shown as a 2-D, Data Matrix type, symbology In the matrix code format, black data elements (cells) usually represent a binary "1" and white data elements (cells) usually represent a binary "0"; but the opposite is also possible. When these binary values are used together in specific sequences, they represent alphanumeric characters. The basic elements of encoded matrix symbol 58, although shown, for example, as a square, may also be rectangular, circular or of other configurations, and usually include a data storage field 72 disposed between either a solid border 74 or a broken border 76, or a combination of same, to facilitate location and decoding of the encoded data. White data cells 78 and black data cells 80 are arranged within data storage field 72, through known conventional methods, to provide encoded data, information and the like. Data Matrix symbol 58 is of the type which has been placed in the public domain and has been recommended by the American National Standards Institute (ANSI) for use in direct part marking. Generally encoded symbols, such as symbol 58, are applied to a carrier strip such as a pressure sensitive label which could then be applied to authenticator 50. However It is preferable for the instant invention to apply symbology 58 by direct part marking for reasons and by methods to be described in greater detail hereinafter.

In direct part marking, according to the instant invention, the machine readable-encoded symbology 58 is to be formed from the same material as authenticator blank 52. Thus, encoded symbology 58 is not to be generated as an arrangement of black and white cells carried by a white substrate. The entire data storage field will appear to the naked eye as a single color, the color of authenticator blank 52; and, as such, both the binary 1's 80 and the binary 0's 78 may also appear to the naked eye as being of the same color, the color of authenticator blank 52. It should be noted that to better explain the instant invention for symbology 58 the binary 1 data cells 80 are illustrated in black and the binary 0 data cells 78 are illustrated as white, but in actuality such cells will appear to the naked eye as being of the same color, of authenticator blank 52; however, as will be hereinafter explained such cells will appear to the imager/reader as being of different reflectivity.

A shank 98 (FIG. 2) may be fabricated to extend down from authenticator blank 52 to facilitate attachment of authenticator 50 to the product, article, the Brand "source" of which is to be authenticated.

The encoding of symbology 58, to be explained in greater detail hereinafter, will include at least the Brand of the "source" for the particular article, as specified by the "source", as well as an identifier unique for each article to be so authenticated. The unique identifiers are to be provided by the Brand "source" authentication system; as will be described in greater detail hereinafter, and may be, for example, individual serial numbers with a different serial number for each such article. Authenticators 50 are prepared for the instant Brand "source" authentication system by the "source" for such system and under authority of the legitimate "source" for the Brand being authenticated. As such, by authenticating the Brand the legitimate Brand "source" is also authenticated.

Figure 3:
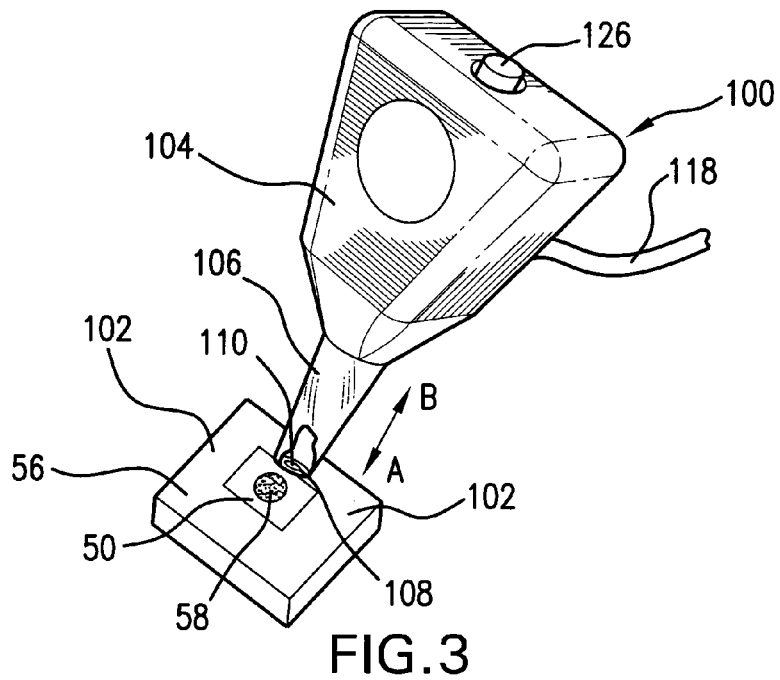
FIG. 3 is a perspective schematic of a new and novel imager/reader, incorporating the instant invention, shown spaced from an authenticator, such as that of FIGS. 1 and 2, but about to be moved into position to image and read the encoded symbology carried by the authenticator.
Figure 4:
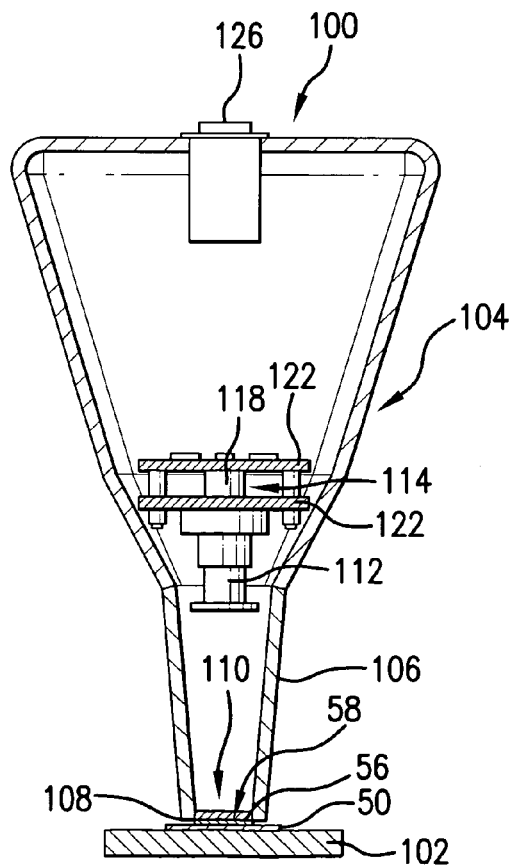
FIG. 4 is a vertical section through the imager/reader of FIG. 3 showing same in position against a Brand "source" authenticator, such as that of FIGS. 1 and 2, and showing the Brand "source" authenticator being carried by a piece of an article or other goods.
Figure 6:
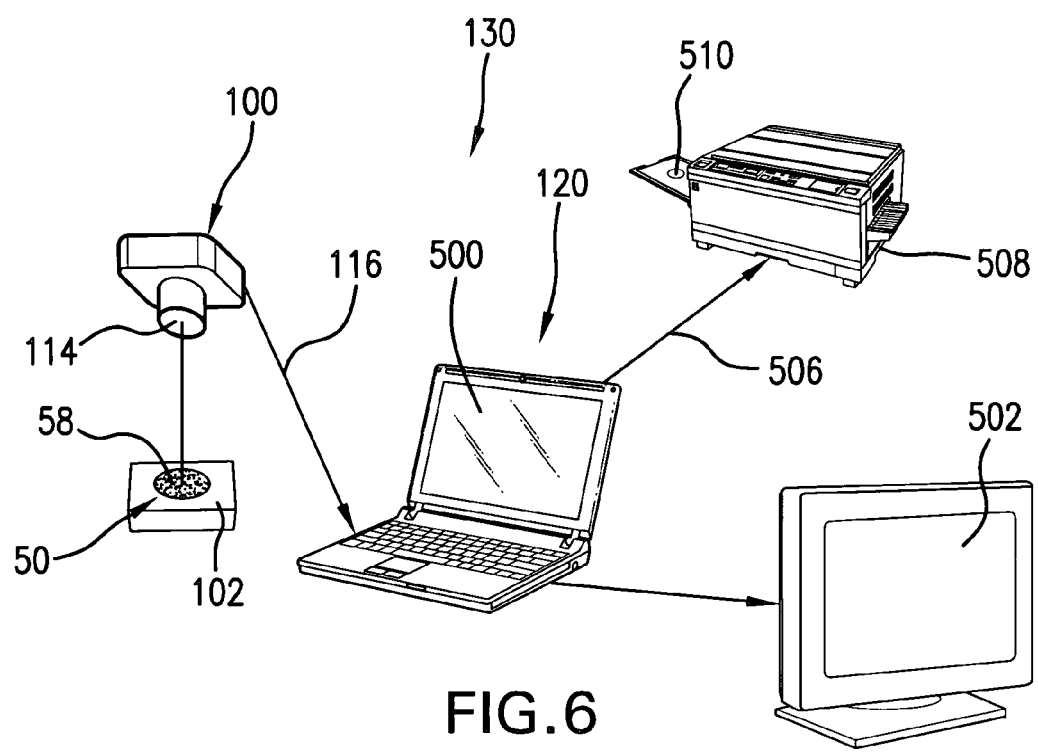
FIG. 6 is a schematic arrangement of some of the components of a new and novel Authentication Station for a Brand "source" authentication system incorporating the instant invention.
Figure 7:
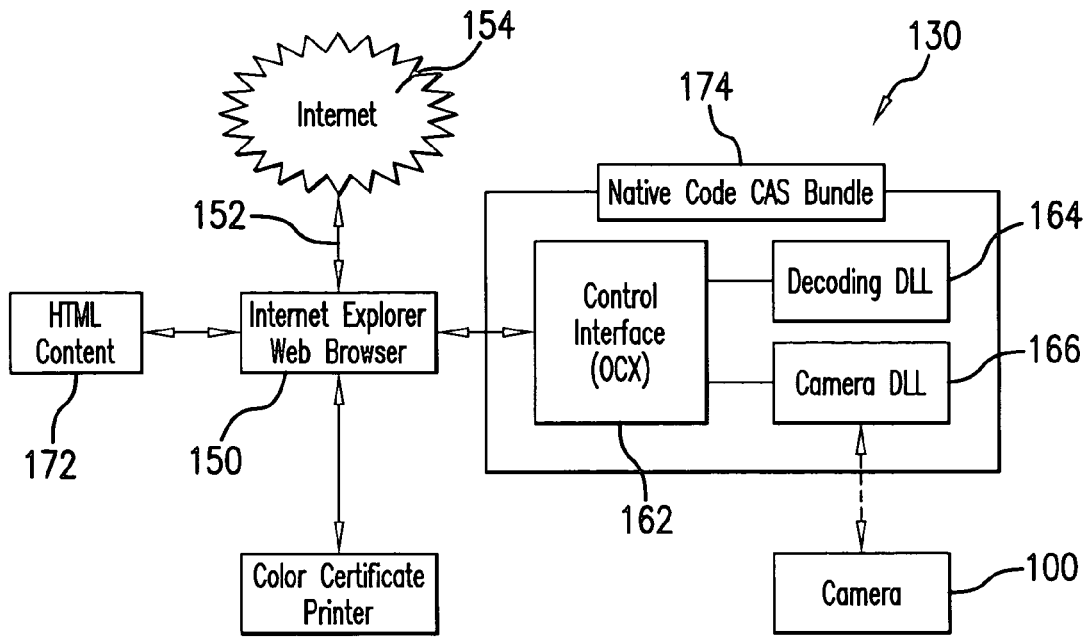
FIG. 7 is a block diagram of the authentication station of FIG. 6.

FIGS. 3 and 4 show an imager/reader 100, incorporating the instant invention, and disposed to be positioned to image and read encoded symbology 58 (FIG. 3) carried by an authenticator 50 (FIGS. 3 and 4) which is secured to an article 102 by means to be hereinafter described in greater detail. Imager/reader 100 includes an imager/reader body 104 provided with a nose cone 106 fabricated from translucent material to thereby act as a diffuser for whatever illumination is to be directed upon encoded symbology 58 of authenticator 50. Nose cones 106 are fabricated to be readily removable and replaceable by other nose cones 106 of different lengths and other characteristics to facilitate imaging/reading of symbology 58. The respective lengths of the nose cones 106 are selected so that when a leading edge 108 thereof is positioned against the surface 56 of authenticator 50, and with symbology 58 positioned within an opening 110 at the leading edge 108 of the respective nose cone 106, the symbology 58 will be positioned at the appropriate focal length for a lens 112 and a camera device 114 disposed within body 104 of imager/reader 100. Lens 112 and camera device 114 are secured within imager/reader body 104 in spaced relationship to coact with each other so that an image of symbology 58 will be disposed upon a sensor 116 of camera device 114 for transmission there from along a cable 118 to a suitable and conventionally available computer 120 (FIGS. 6 and 7) of an authentication workstation 130 (FIGS. 6,7 and 8) for decoding and subsequent use. Sensor 116 of camera 114 is selected herein to be of the CMOS type but a sensor of the CCD type may also be utilized. Sensor 116 is coupled through appropriate and conventionally available camera circuitry which in the disclosed camera 114 is carried by a pair or circuit boards 122 coupled thereto to provide a read out there from to computer 120 (FIGS. 6 and 7) at authentication workstation 130.

Figure 5:
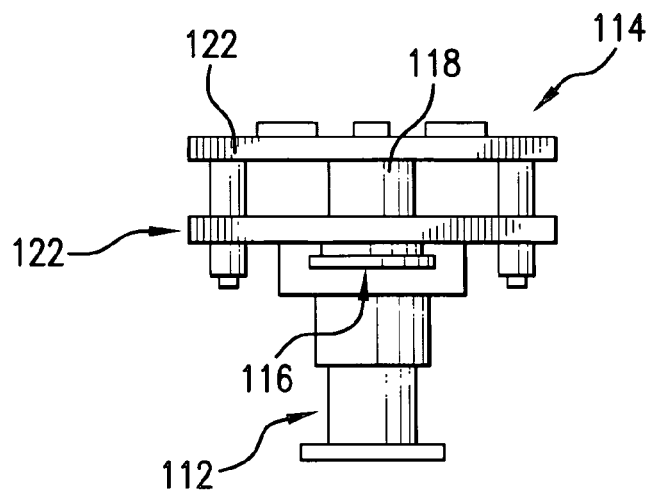
FIG. 5 is a vertical view of the imaging system of the imager/reader of FIGS. 3 and 4 removed from the imager/reader to better show details thereof.

A lens mount 124 FIGS. 4 and 5) is provided within imager/reader 100 to facilitate positioning lens 112 between camera device 114 and opening 110 of nose cone 106 so that encoded symbology 58 carried by an authenticator 50 and positioned for imaging by imager/reader 100 is at a proper focal position. Lens mount 130 may be fixedly positioned within imager/reader 100 or it may be mounted for relative movement along with its lens 112 with respect to sensor 116 of camera device 114 to provide a movable focal plane for symbology 58 to be imaged and decoded. Nose cone 106 may also be fixedly mounted to imager/reader body 104 or it may be interchangeably secured thereto for replacement by other nose cones of alternate lengths and with an opening 110 of different sizes and configurations to accommodate encoded symbology fields 54 of different sizes shapes and/or configurations for authenticators 50. Nose cone 106 may also be interchangeable with nose cones of other constructions as will be hereinafter explained in greater detail. An operating button 126 (FIGS. 3 and 4), appropriately and suitably connected to system components functions to operate imager/reader 100 and to initiate operation of the authentication system.

Nose cone 106 functions herein as an illumination diffuser and not an illumination waveguide or light pipe. It is composed of a translucent material that passes ambient light to effect a 'cloudy day' or 'diffused' or 'scattered' light illumination. If there is sufficient ambient light (from overhead lights or table lights in a store), then additional illumination may not be necessary. The nose-cone wall thickness and opacity may also be varied. As previously set out nose cone 106 is interchangeable and is an integral concept of the imager/reader. Nose cones of various lengths may be utilized depending on the focal lengths to be encountered. In addition the openings at the end of the nose cone may be varied in diameter and configuration to accommodate encoded symbology of the various sizes and configurations. Not only will different length nose-cones effect appropriate focal lengths to image symbology being read; but the end of nose cone 106 may also be tailored to match the shape of the object being processed. (For example a watch may have a Data Matrix on the face of the watch below the crystal, requiring a shorter nose-cone. The end of nose-cone 106 may also be machined to provide for precise alignment for centering the image in camera device 114.

Authentication workstations 130 (FIGS. 7 and 8) are provided at selected facilities and locations which preferably may include locations such as manufacturing plants 132 (FIG. 8), supply-chain warehouses 134, retail stores 136, and administrative offices 138. Authentication workstations 130-138 are the user's point of access to the authentication system. Each such workstation 130-138 is shown to include one or more laptop or low-end desktop computers 120 (FIG. 6), of substantially conventional configuration, running an Internet Explorer web browser 150 (FIG. 7) also of conventional configuration. Converting an existing computer 120 into an authentication workstation 130-138 requires nothing other than web browser 150 (FIG. 7) with an appropriate connection 152 to access the available internet 154. Users of the authentication system access the software from within a standard web browser running on low-end consumer-grade computers or integrated workstations containing embedded processors. There is no installation footprint for authentication workstations 130-138. The bulk of the software is run on substantially available web portal servers 160 (FIG. 8), and only a conventionally available small control interface (OCX) 162 (FIG. 7) runs on the workstation 130-138 to provide control of camera DLL (Dynamic Link Library) 164 and Data-Matrix decoding DLL 166.

Authentication workstation architecture (FIG. 7) includes the use of a standard and substantially available web browser such as Internet Explorer 150 to provide reliable authenticated results. However, because the authenticating party must use imager/reader 100 with its associated sophisticated Data-Matrix decoding software located in computer 120, standard HTML web content 172 (FIG. 7) may be insufficient to provide all the features necessary for the authentication system of the instant invention. Native code CAB bundle 174 is a compilation of non-HTML content that will run natively and conventionally at workstation 130. Bundle 174 is downloaded and executed seamlessly by web browser 150. The download occurs once, on the first connection of web-browser 150 to web portal 160. Thereafter, native bundle 174 remains on an authentication workstation local disk. Native bundle 174 includes USB camera DLL 164 and data-matrix decoding DLL 166, along with control interface 162 to expose the functionality to web browser 150. Decoding is done at an authentication workstation 130 to maximize bandwidth efficiency. A decoded symbology code is less than 0.1 Kbytes, whereas an un-decoded captured image is roughly 300 Kbytes (a 3000× increase). Because decoding is done at a workstation 130-138, each workstation 130-138 may need to be licensed to use a decoding software 166. Most likely, a site-license may be purchased from a licensor that will enable all workstations 130-138 to be licensed for use as authenticating workstations 130-138. Microsoft Internet Explorer conventionally supports control interface 162 to execute native code 174. Other popular web browsers include Firefox, Safari (Macintosh), and Opera. Because other web browsers have a different interface for executing native code, an additional native bundle may need to be developed for each web browser that the authentication software must support. In practice, all the web browsers except Internet Explorer use a very similar API (Application Programmer Interface) for execution of native code. Therefore it is likely that one additional implementation of the native code bundle will cover the majority of other popular web browsers.

Figure 8:
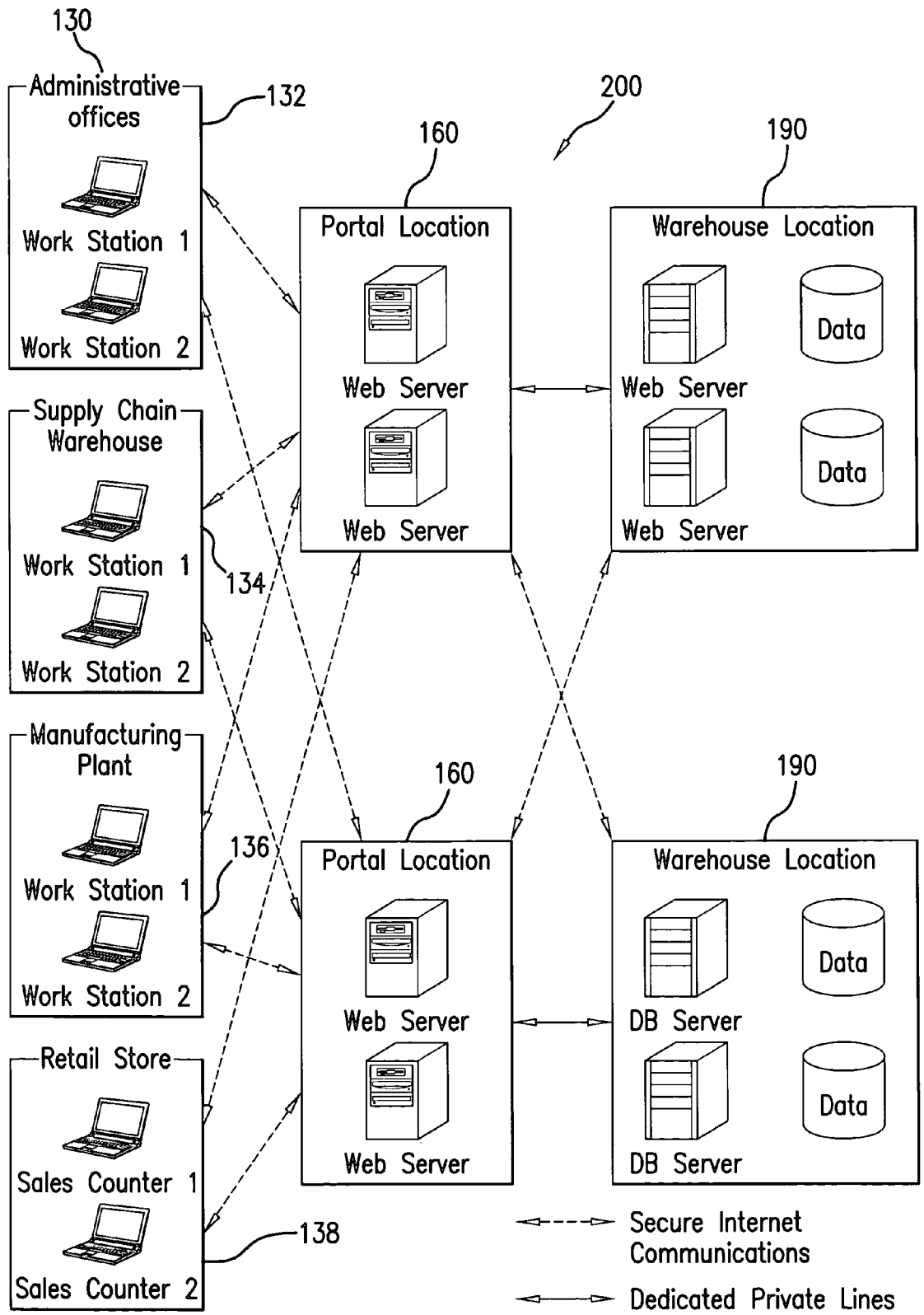
FIG. 8 is a block diagram of the new and novel authentication system incorporating the instant invention.

Authentication workstations 130 in association and communication with web portal servers 160 and substantially conventionally available data warehouses 190 FIG. 8) provide a 3-tier architecture 200 as shown in FIG. 8 for the authentication system of the instant invention. Massive scalability is thus available through the described application design through wide-area distribution, that is furthermore flexible enough to allow the system features to evolve over time. The physical locations for data warehouses 190 and portal servers 160 need not be distributed across 2 facilities, or even 2 computers; and, as such, they may co-exist in the same computer until the authentication system is large enough to merit their separation.

Each data warehouse 190 stores chain-of-custody data for authenticated articles in relational databases. A data warehouse 190 might consist of 1 or more Oracle (or other brand) database servers running on high-end server computers. Selected locations for data warehouses 190 might be spread all over the world in strategic locations to mitigate the cost of conventional communication links (not shown) to the nearest web portal. 160. Providing data warehouses 190 as a distinct tier in the authentication system architecture of the instant invention also enables Brand "source" parties to store there own selected identification data on server computers maintained at their own private facilities.

The locations for portals 160 serve as Internet connection points for the multitude of authentication workstation 130 computers 120 accessing the authentication system. A web portal might consist of 1 or more conventionally available web servers 192 running on high end server computers. Multiple web portals 160 create redundancy in the system when a facility loses power or Internet connectivity. Also, strategically placing web portals 160 around the world provides faster Internet access to more locations by proximity. As such web portals 160 constitute key components of the top-level topology of the authentication system for the instant invention, as shown by way of example in FIG. 8. Each web portal server 160 runs: a conventionally available web server 192, such as an Apache; the authentication system web-application 194, and other software. Connectivity is through the Internet (secure sockets, SSL) and through dedicated private communication lines to the locations of data warehouses 190. Web portals 160 perform the business logic of the authentication system. Dynamic HTML content is generated by the authentication system web application and is served to clients by the web server.

Figure 9:
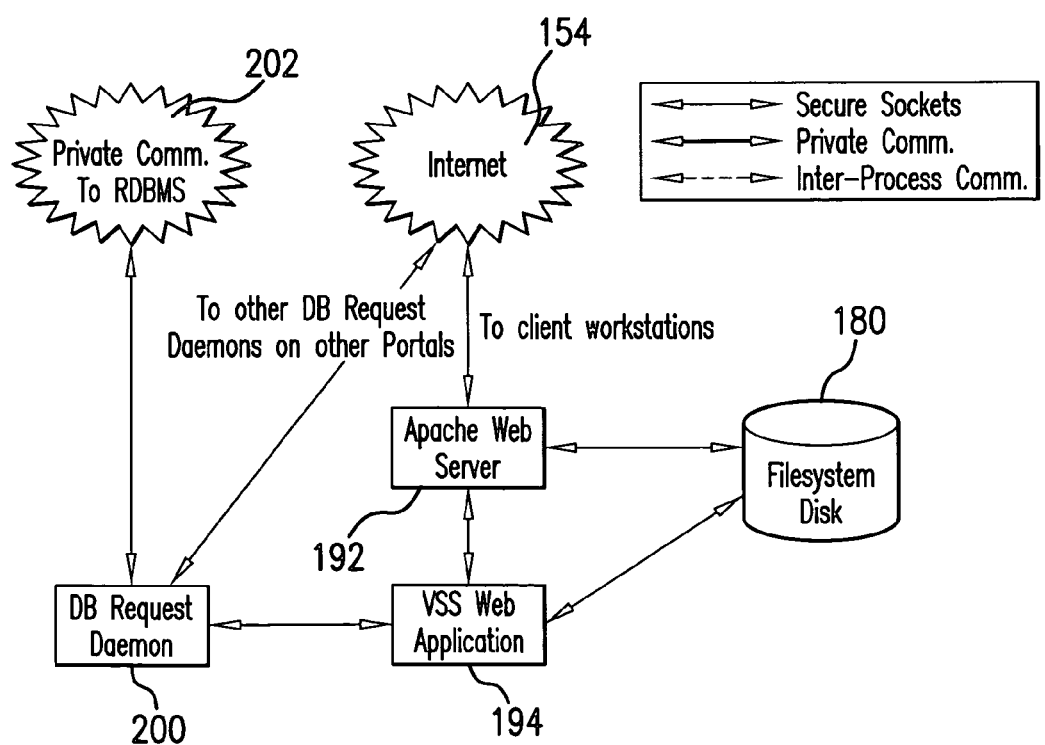
FIG. 9 is a block diagram of the new and novel web portal, incorporating the instant invention, for the authentication system of FIG. 8
Figure 10A:
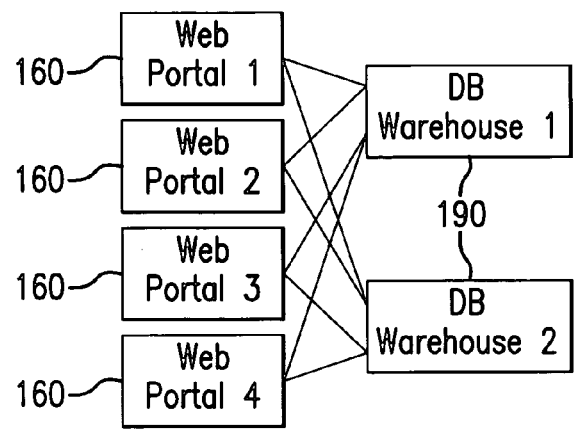
FIG. 10A is a block diagram of the new and novel communication links between the web portals and data banks of the authentication system of FIGS. 8 and 9.
Figure 10B:
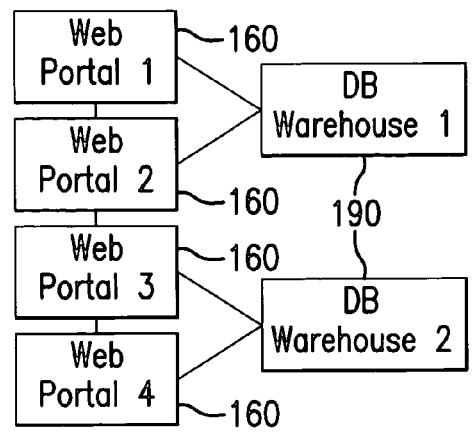
FIG. 10B is a block diagram of an alternative embodiment of new and novel communication links between the web portals and data banks of the authentication system of FIGS. 8 and 9.

Aiding the authentication system web application of the instant invention is a data base request daemon (DBRD) 200 (FIG. 9), which performs the tasks of actually interfacing with the relational database through a conventionally available relational data base management system (RDBMS) 202 The purpose of database request daemon 200 is to abstract and decouple the database communications from the authentication system web application. Since there will likely be numerous locations for database warehouses 190 and numerous locations for web ports 160, it is unlikely that every web portal 160 can have a dedicated connection to every database warehouse 190 (due to excessive cost). Therefore, each web portal 160 may be provided with a connection with a subset of the data warehouses 190, such as shown in FIGS. 10A and 10B, and if a portal 160 requires data from a database 190 with which it has no connection, then data base request daemon 200 can forward the request for data to another web portal 160 whose data base request daemon 200 has a direct connection with the required database 190. This architecture mitigates the need for a private communication lines for every location of and combination of web portal 160 and data warehouse 190 and reduces the required number of dedicated communication lines to data warehouse locations 190 by allowing web portal sites 160 to forward requests to each other Data base request daemon 200 will likely be built using a standardized message service that already provides the complex functionality of synchronously guaranteeing message delivery. Such messaging service APIs (application programmer interface) may include JMS and MSMQ.

Encoded symbology 58 (FIG. 1), as provided onto surface 56 of authenticator blank 52 of authenticator 50, is preferably provided thereon thru laser application or dot peening of a 2D data-matrix type encoded symbology. It should be understood, nevertheless, that other 2D encoded symbologies may just as well be utilized, that even 1D line type bar codes may be employed and that such symbology need not be encoded and that even alpha, numeric and alpha-numeric characters may be employed as symbology 58. While symbology 58 is preferably direct part marked onto or into its surface 56 it may also be first applied to a substrate which is thereafter secured to surface 56 of authenticator blank 52. The "1" or "0" elements of symbology 58 may, when direct part marked, be provided as indentations into surface 56 of authenticator blank 52 or as raised elements upon such surface 56; it being further understood that the alternative element "1" or "0" will constitute the surface 56 of authenticator blank 52. The size of the field within which the encoded symbology is to be placed and of the encoded symbology itself may be selected with sizes between 1 mm and 10 mm being preferred. The respective size of the authenticator is to be selected to accommodate the size of the encoded symbology as well as the other indicia to be carried by the authenticator.

Authentication workstations 130 of the Brand "source" authentication system are used as routers to send validation queries to the appropriate database 190 for validation. Databases 190 can reside either at a Brand "source" site or at an authentication system server location. The authentication system is used to authenticate articles (products, goods) from multiple companies and having a single authentication workstation 130 at a Point Of Sale location reduces the system cost. While the authentication system has the capability to log identifier queries and accumulate statistics for sales purposes, this feature is an optional service and is only activated upon Brand "source" request. The authentication system Code of Ethics includes that no Brand "source" data will be monitored without Brand "source" written approval.

Figure 11:
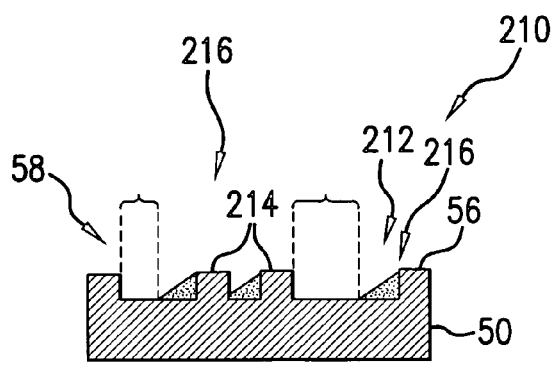
FIG. 11 is a schematic section through the symbology of the instant invention as shown, for example, in FIG. 1
Figure 12:
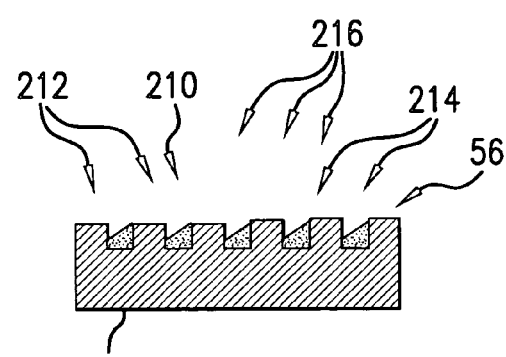
FIG. 12 is a schematic section through another portion of the symbology of the instant invention as shown, for example, in FIG. 1.
Figure 13:
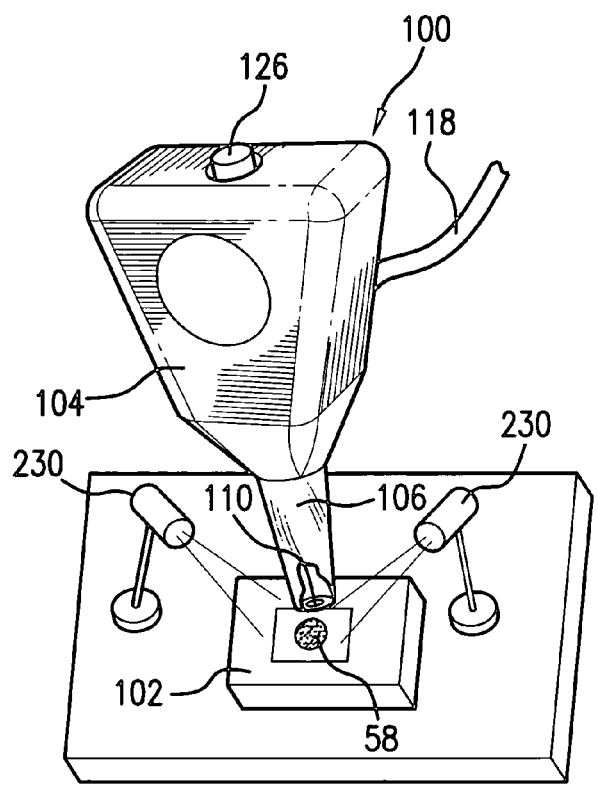
FIG. 13 is a perspective schematic view, similar to that of FIG. 3, but showing separate sources of illumination to facilitate imaging and reading the encoded symbology carried by the authenticator.
Figure 14:
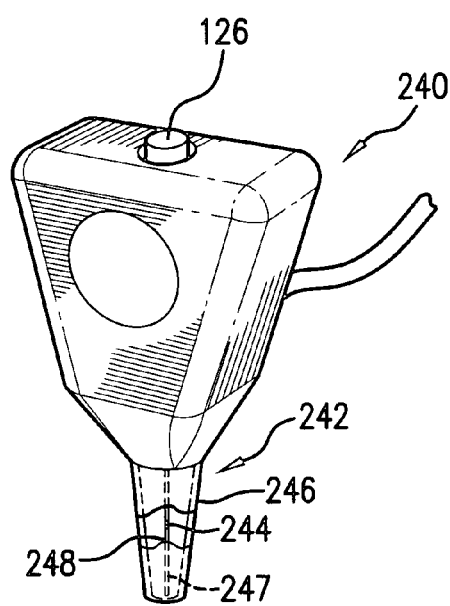
FIG. 14 is a perspective schematic view of an alternative embodiment of reader/imager, incorporating the instant invention and equipped with a source of illumination.
Figure 15:
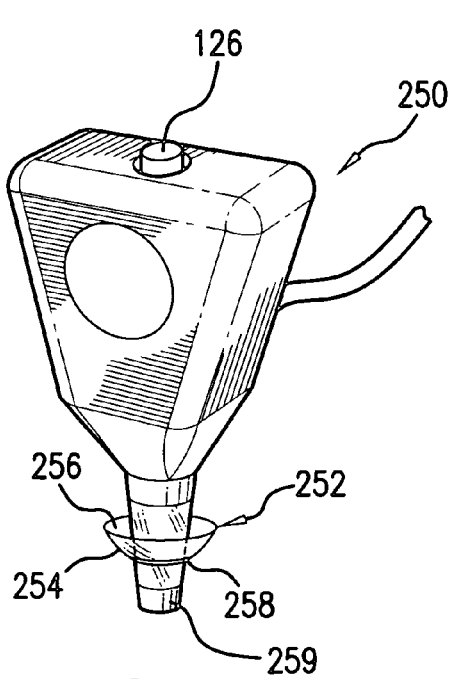
FIG. 15 is a perspective schematic view of another alternative embodiment of reader/imager, incorporating the instant invention and equipped with an alternative source of illumination.
Figure 16:
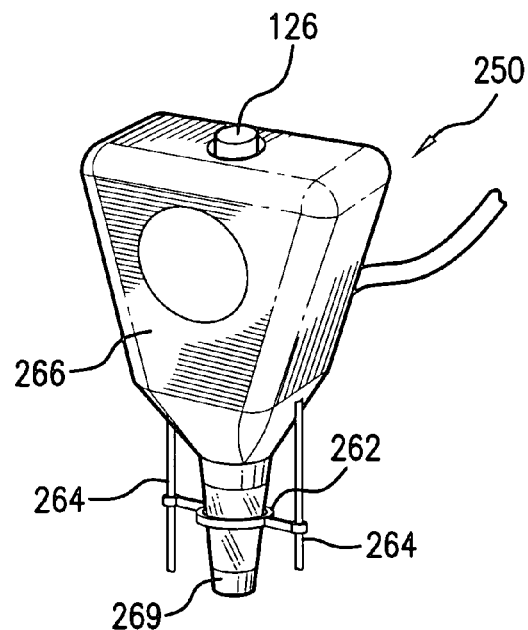
FIG. 16 is a perspective schematic view of yet another alternative embodiment of reader/imager, incorporating the instant invention and equipped with a further alternative source of illumination.

FIG. 3 shows imager/reader 100 being positioned to image symbology 58 for subsequent decoding and use for purposes of the instant invention. Imager/reader 100 is moved in the direction of arrow A (FIG. 3) so that opening 110 of nose cone 106 is positioned against surface 56 of authenticator 50 with its encoded symbology 58 within opening 110, as shown in FIG. 4. Ambient illumination passes through nose cone 106 and illuminates surface 56 of authenticator 50 so that illumination reflected off of surface 56 and encoded symbology 58 will pass through lens 112 (FIG. 4) and upon CMOS sensor 116 (FIG. 5) for subsequent decoding and use. FIGS. 11 and 12, by way of example, illustrate a portion 210 of an encoded symbol 58 with recessed areas 212 separated by adjacent part material surfaces 214 of the symbol at the level of the authenticator surface 56. Illumination 216 is projected towards symbology 58 at an angle and so that the reflections from recesses 212 and surfaces 214 present sufficiently different contrasts upon sensor 116 to provide an accurate differential there between and an accurate decoding of encoded symbology 58.

Where there is insufficient ambient illumination additional illumination may be provided through free standing or fixedly positioned illumination sources 230 as shown, by way of example in FIG. 13. Imager/readers 240 (FIG. 14), 250 (FIG. 15) and 260 (FIG. 16) provide additional embodiments of ring-light type illumination sources 242, 252, and 262 respectively to compliment ambient illumination or where there is either no ambient illumination or available ambient illumination is insufficient to prove an accurate and readily decodable image for sensor 116. Ring-light embodiment 242 (FIG. 14) includes a ring-light 244, sandwiched between translucent nose cone 106 of illuminator 240 and an opaque nose cone outer shell 246. A slot 247 is formed to extend the length of shell 246 and so as to permit a handle 248, extending from ring light 244, to be adjusted along the length of slot 247 and nose cone 106. Ring light embodiment 252 (FIG. 15) includes a reflective cup 254 with illumination sources 256 in a substantially horizontal plane pointing toward the center of a substantially cylindrical nose cone 257. Reflective cup 254 can either be fixedly secured to nose cone 257 or adjustable along nose cone 257 and provided with a clamping device 258. Cup 254 may also be fabricated and configured to turn spirally in groves formed in an outer surface of nose cone 257. Any wires, connecting illumination sources to a suitable source of power, can be coiled up in cup 254 as it moves upwardly along nose cone 257. In the embodiment of FIG. 16 ring light 262 is fabricated to slide along rods 264 carried by body 266 of imager/reader 260. An Illumination source or sources 268 is carried by ring light 262 and connected to a source of power by conductors extending through rods 264. Ring lights 242, 252 and 262 provide for more uniform lighting into the respective diffuser nose-cones 106, and 257. The respective ring lights can consist of 2 or more red or white LED's, a mixture of red and white LED's, or alternate red and white LED's in a ring. In combination with the ring-lights, portions 259 (FIG. 15), 269 (FIG. 16) respectively of the nose-cone may be made opaque to minimize the effect of unwanted ambient light. The respective ring-lights can be either a thin sandwich style, like a washer, with all the leds pointing to the center of the hole, or be integrated in a reflector with a curved surface that improves the capture of scattered light. By sliding a ring-light downward (either on rods attached to the housing, or press fit on a cylindrical portion of the nose-cone, or sandwiched between and inner and outer shell nose-cone with an arm extending through a vertical slot), one can shift the illumination pattern from 'cloudy day' toward 'dark field illumination' (low angle illumination). Either cloudy day and dark field illumination (or a mix of the two) can be provided, depending on the surface of the Data Matrix symbology being read, by properly positioning the ring-light along the translucent nose-cone.

An alternative embodiment of authenticator 300, incorporating the instant invention, is shown in FIG. 17. Authenticator 300 is fabricated from materials similar to those of authenticator 50 of the FIGS. 1 and 2 embodiment and includes a surface 302 carrying encoded symbology 304 formed and otherwise similar to and for use as the previously described embodiments. Body 306 of authenticator 300, however, is formed with a space 308 therewithin. An RFID chip 310 is housed within space 308 for reasons to be explained. A groove 312 is formed around body 308 of authenticator 300 to facilitate its installation on an article. To effect such installation first a tool 320 (FIGS. 18 and 19) with a cutting edge 322 is positioned within a tool guide 324 (FIG. 19) positioned on a surface 326 of an article 328 the Brand "source" of which is to be authenticated. Article 328 may be a watch or piece of jewelry or the like. Cutting tool 320, when positioned within tool guide 324 and utilized, will form a recess 330 in surface 326. The height of a shank portion 334 of tool 320 is selected to equal the depth "y" of recess 330 plus the height "x" of tool guide 324 so that when an undersurface 336 of a cap portion 338 of tool 320 touches an upper surface 340 of tool guide 324 recess 330 will be formed to its selected depth "y". An appropriate adhesive 342 is disposed within recess 330 sufficient to fill groove 312 of authenticator 300 and any portion of recess 330 not occupied by authenticator 330.

By including RFID chips 310 in authenticator 300 tracking the movement of batched articles is greatly facilitated and enhanced. However such RFID chips are typically not used for Brand "source" authentication. RFID chips provide a complementary technology and RFID can be used to track Brand "source" authenticated articles along the supply chain. An RFID chip should be able to identify identifiers contained within a container through appropriate database functions. Database 190 is designed to accommodate logging article tracking along the supply chain from manufacturing site to distribution center. However, Brand "source" authentication for such articles requires scanning of the actual authenticator on the article, rather than being inferred from an RFID database entry.

Yet another alternative embodiment of Brand "source" authenticator, incorporating the instant invention, is shown at 350 in FIG. 21. Authenticator 350 includes a surface 352 upon which encoded symbology 354 is applied, as by laser or dot peening in the manner and for purposes hereinabove described for previously described embodiments of the instant invention. Authenticator 350 is fabricated from materials described for use in fabricating authenticators previously described herein and is substantially cylindrical in external configuration with external threads 356 formed thereabout for engagement with internal threads 358 formed in article 360 the Brand "source" of which is to be authenticated. Article 360 may be an article of jewelry such as a bracelet or a band for a watch, or the like.

Still another Brand "source" authenticator 400 is shown in FIGS. 22 an 23. Authenticator 400 is, itself, a gem stone with a surface 402 upon which encoded symbology 404, of the types previously described herein, is applied by direct part markings as by laser or the like. Authenticator 400 may be a separate gemstone affixed to an article 406 (FIG. 23) such as a watch; or it may be a gemstone such as a diamond or the like.

To utilize and apply the Brand "source" authentication system described in this application the Brand "source" (manufacturer, distributor, wholesaler, retailer or the like) requests batches of symbology encoded serial numbered authenticators, such as authenticators 50, 300, 350, or 400, from the independent, third party, authentication system "source" or a different third party vendor approved by the authentication system "source". (An approved authenticator "source" may also be the article, product, manufacturer.) The symbology encoded serial numbers or identifiers, of the authenticators so provided are not entered into database 190 (FIG. 8) until the batch is released to manufacturing. Access to database 190 is via secure terminal links (https:) as described herein with respect to FIGS. 7, 8 and 9) with special logins and passwords for entering new identifiers for each manufacturing facility. An audit trail is created for each identifier entered into database 190, including the logging of user id, login terminal id (ip address) and date. The identifiers of the so supplied encoded symbology authenticators are enterprise-specific and only authorized persons at the destined enterprise are able to enter new authenticator identifiers into database 190. If symbology encoded, serial numbered authenticators fall into devious hands, those hands must have access to the specific enterprise workstation authorized to enter the identifiers into database 190. Periodically changing of passwords is recommended as a further deterrent to unauthorized terminal access.

A fixed format for authenticator symbology encoding is preferred. There is, however, also an option of a Brand "source" using their own encryption on a portion of the encoded symbology. The encryption key can be kept confidential by the Brand "source" or it can be stored in database 190, at the Brand "source's" option. The identifier preferably consists of either a 3 character preamble starting with {VM-??} or a BAx where BA indicates it is a Brand Authenticator code string and x is a 1 character identifier for the type of encoding sequence to follow and followed by a 6 character authenticator Brand "source" assigned enterprise identifier unique to each Brand "source" site. The remaining information is up to the Brand "source" but should contain a product identifier, a unique serial number and optionally a date and lot code. However, the one requirement is that each identifier be a unique number, whether it is encrypted or not.

A party, such as a purchaser of a Brand "source" authenticated article, may first visually inspect the article to see if it carries a Brand "source" authenticator. The party then may either themselves utilize an authentication workstation 130 (FIGS. 6, 7 and 8) or request a sales person to authenticate the Brand "source" before purchasing the article. Authentication then requires positioning nose cone 106 of imager/reader 100 against encoded symbology 58 of the authenticator 50 carried by the article and operating imager/reader 100 by operating button 126 carried thereby a hereinabove described in greater detail. The successful reading of encoded symbology 58 and decoding thereof by computer 120 results in transmission of the encoded data through web portal 160 to data warehouse 190 for comparison to comparable data stored in warehouse 190. A positive comparison with the stored data that the article being authenticated is the article with the data sent to warehouse 190 by the Brand "source" thereafter appears on the screen 500 (FIG. 6) of computer 120 as well as on a monitor 502 interconnected by a suitable cable 504 to computer 120. Also interconnected to computer 120, by a suitable cable 506, is a printer 508 which upon a proper signal from computer 120 will print an Authenticity Certificate for the article to be purchased indicating thereon the Brand "source" trademark(s) and/or Logo(s) as well as the place and date of purchase if so configured to do so.

The herein described Brand "source" authentication system database includes a number of built-in checks to catch duplicate identifiers. As part of the validation process, a chain of custody record may be stored in database 190. Once an article has been sold, or otherwise moved from the Brand "source" the information is added to the chain of custody record. That chain of custody may thereafter be compared with the intended chain of custody. If the two do not match, validation will not take place. If an identical identifier is submitted for authentication after the initial sale, it will not be validated and the requestor information will be recorded in a fraudulent identifier report. The database has a provision to allow changes in custody as by transfer of ownership once an item has been sold. Resale information can be entered by an authorized authentication system user. The fraudulent identifier report also flags multiple sales of an identifier within a given time period. It should be noted that authenticators include a copyrighted and trademarked logo and making copies of it violates copyright and trademark laws permitting active prosecution of infringing violators.

If desired a current owner should have received an Authenticity Certificate 510 (FIG. 6) at the time of their purchase. An authorized retailer with an authentication system can verify that the Certificate is valid and the owner matches the owner of record if that information has been made available. The authorized retailer can then flag the article identifier for resale in the data base 190 and receive back a resale confirmation code. The purchaser can bring the item to an authorized retailer and along with the resale confirmation code be registered as the new owner of record. A digital fingerprint is provided on the Authenticity Certificate and, in turn, provides the authentication system with a means to guarantee against a) fraudulent certificates created by a hacker, and b) fraudulent alteration of the authentication system database by a hacker. If any hacker tries to create a false certificate, it is impossible for them to generate an accurate digital fingerprint because this data is generated by applying a secure checksum to all the database transactions that led up to the creation of a valid certificate. It is impossible for a hacker to generate such secure data. If any hacker tries to unscrupulously alter the authentication system database, the digital fingerprint will necessarily change as a result of the hacker's database changes, and the authentication system will immediately detect the attempted unauthorized database alteration.

The validation process uses secure 128-bit encrypted communication to the authentication system server. A secure cryptographic certificate, researched and authenticated by a well-known and trusted issuing authority, XYZ. XYZ and other certificate-issuing authorities perform extensive research to guarantee that all cryptographic certificates they issue really belong to the companies who use them. Furthermore, all modern web browsers will refuse to accept any certificate issued by any authority other than those that perform the physical research necessary to prove the identity on their certificates. Therefore, a hacker attempting to create a certificate that a web browser will accept and which claims to be from the herein disclosed and described authentication system is impossible.

It is understood that although there has been shown and described preferred embodiments of this invention that various modifications may be made in the details thereof without departing from the spirit as comprehended by the following claims.

What is claimed is:

1. A Brand "source" authenticator; comprising,
   a). a carrier with at least a first human observable surface;
   b). authenticator indicia carried by said first human observable surface;
   c). said authenticator indicia indicating the "source" of the Brand "source" authenticator;
   d). authentication indicia also carried by said carrier;
   e). a selected portion of said carrier being usable to attach said carrier to an article to facilitate authentication of the Brand "source" of the article; and
   f). said authentication indicia including at least encoded symbology which,
when decoded, indicates the Brand "source" of the article to which said carrier is to be attached.

2. The Brand "source" authenticator of claim 1 wherein said authentication indicia further includes an identifier unique to each individual article to which said carrier is to be attached.

3. The Brand "source" authenticator of claim 1 wherein said authentication indicia is of the 2D Data Matrix type.

4. The Brand "source" authenticator of claim 3 wherein said authentication indicia is applied to said carrier by the use of a laser.

5. The Brand "source" authenticator of claim 1 wherein said authentication indicia is direct part marked onto said carrier.

6. The Brand "source" authenticator of claim 2 wherein said authentication indicia also includes encoded symbology with additional characterizations of the article to which said carrier is to be attached.

7. The Brand "source" authenticator of claim 1 wherein said authenticator indicia includes a Brand of the authenticator.

8. The Brand "source" authenticator of claim 7 wherein said authenticator indicia also includes a Brand of the "source" of the article to which the carrier is to be attached.

9. A Brand "source" authentication system for multiple articles; comprising
   a). a Brand "source" authenticator to be attached to each such article;
   b). encoded Brand "source" authentication symbology carried by each of said Brand "source" authenticators;
   c). each said authentication symbology including an indicia unique to the article to which it is to be attached such that each of said Brand "source" authenticators is unique and differs from all other Brand "source" authenticators;
   d). said Brand "source" authentication symbology including said unique indicia being applied to each said authenticator by a party other then the Brand "source" and
   e). authenticator indicia also carried by each said Brand "source" authenticator indicating the "source" of the Brand "source" authenticator.

10. The Brand "source" authentication system of claim 9 wherein the party other then the Brand "source" also maintains a data storage file of the respective authentication symbology including said unique indicia.

11. The Brand "source" authentication system of claim 10 wherein the respective authentication symbology with each said unique identifier is entered into said data storage after its carrier is attached to an article preferably by the party attaching the carrier to the article.

12. The Brand "source" authentication system of claim 11 including an imager/reader to image and decode said authentication symbology carried by said carrier and to effect a comparison thereof with the data stored in said data storage.

13. The Brand "source" authentication system of claim 12 including a printer for printing an authentication certificate upon a positive comparison of said encoded symbology carried by said carrier and said data stored in said data storage.

14. The Brand "source" authenticator of claim 9 wherein said authenticator indicia includes a Brand of the authenticator.

15. The Brand "source" authenticator of claim 14 wherein said authenticator indicia also includes a Brand of the "source" of the article to which the carrier is to be attached.

* * * * *